United States Patent
Li

(10) Patent No.: US 7,107,032 B2
(45) Date of Patent: Sep. 12, 2006

(54) RADAR DETECTION METHOD FOR RADIO LOCAL AREA NETWORKS

(75) Inventor: Kuo-Hui Li, Hsinchu (TW)

(73) Assignee: Mediatek Inc., Hsinchu (TW)

( * ) Notice: Subject to any disclaimer, the term of this patent is extended or adjusted under 35 U.S.C. 154(b) by 522 days.

(21) Appl. No.: 10/338,388

(22) Filed: Jan. 8, 2003

(65) Prior Publication Data

US 2004/0132411 A1 Jul. 8, 2004

(51) Int. Cl.
*H04B 1/10* (2006.01)
*H04B 17/00* (2006.01)
*G01S 13/00* (2006.01)

(52) U.S. Cl. ................ 455/296; 455/226.3; 455/67.11; 342/57

(58) Field of Classification Search ............. 455/67.11, 455/63.1, 67.13, 423, 296; 342/159, 192, 342/195, 57
See application file for complete search history.

(56) References Cited

U.S. PATENT DOCUMENTS

| | | | |
|---|---|---|---|
| 6,697,013 B1 * | 2/2004 | McFarland et al. | 342/159 |
| 6,870,815 B1 * | 3/2005 | McFarland et al. | 370/250 |
| 2003/0107512 A1 * | 6/2003 | McFarland et al. | 342/159 |
| 2003/0214430 A1 * | 11/2003 | Husted et al. | 342/57 |
| 2005/0054294 A1 * | 3/2005 | Khun-Jush et al. | 455/63.1 |
| 2005/0111415 A1 * | 5/2005 | Soomro et al. | 370/338 |

FOREIGN PATENT DOCUMENTS

WO  WO 02/082844  * 10/2002

OTHER PUBLICATIONS

IEEE 802 proposal relating to DFS and JPT5G proposal IEEE 802.RR-02/018A-D5 published Jan. 2002.*

* cited by examiner

*Primary Examiner*—Tilahun Gesesse
(74) *Attorney, Agent, or Firm*—Thomas, Kayden, Horstemeyer & Risley

(57) ABSTRACT

A method of radar detection in a channel for radio local area networks operating in a regulatory band. First, a quiet time and quiet period are set, in which the ratio of the quiet time to the quiet period equals 1:4. The channel is quieted for the quiet time periodically at a rate dictated by the quiet period in order to be tested for radar. During each quiet time, a received power is measured to determine whether it exceeds a predetermined threshold. Radar presence is declared when the received power on that channel exceeds the predetermined threshold.

16 Claims, 4 Drawing Sheets

RADAR DETECTION METHOD FOR RADIO LOCAL AREA NETWORKS

BACKGROUND OF THE INVENTION

1. Field of the Invention

The invention relates to a wireless local area network (WLAN), and more particularly to radar detection required for high-speed WLANs in regulatory frequency ranges.

2. Description of the Related Art

Recent approval of the IEEE 802.11 standard for wireless networking and rapid progress toward higher data rates have positioned this technology to fulfill the promise of truly mobile computing. IEEE 802.11, part of a family of standards for local and metropolitan networks, defines wireless LAN media access control (MAC) and physical layer (PHY) specifications. In addition to the base standard, IEEE 802.11a is a supplement defining the high-speed PHY in the 5 GHz band, and IEEE 802.11h is another supplement for spectrum management in the 5 GHz band in Europe.

The 5 GHz band in Europe refers to the nineteen 20 MHz channels between 5 GHz and 6 GHz in which WLAN operation is allowed in the regulatory frequency bands ranging from 5.15~5.35 GHz and 5.47~5.725 GHz. According to ERC Decision of 29 Nov. 1999 made by European Radiocommunications Committee, WLANs (a.k.a. radio LANs, RLANs) operating in the 5 GHz band are required to implement a mechanism to avoid co-channel operation with radar systems and to ensure uniform utilization of available channels. Therefore, RLAN equipment conforming to the IEEE 802.11h standard must employ a Dynamic Frequency Selection (DFS) mechanism to detect interference from other systems and to avoid co-channel operation with other systems, notably radar systems. However, the methods to detect radar operation in a channel that satisfy regulatory requirements are not defined in IEEE 802.11h.

Accordingly, what is needed is an efficient method of radar detection to meet requirements in some regulatory domains for operation in the 5 GHZ band.

SUMMARY OF THE INVENTION

It is an object of the present invention to provide a method of radar detection for RLANs operating in regulatory frequency bands that is simple to implement in an integrated circuit.

It is another object of the present invention to provide a set of optimum parameters associated with channel quieting for radar detection to maximize network throughput.

The present invention is generally directed to a method of determining the presence of radar in a channel. According to one aspect of the invention, a quiet time and a quiet period are set first. Note that the ratio of the quiet time to the quiet period is 1:4. The channel is forced to quiet for the quiet time repeatedly at intervals of the quiet period. Meanwhile, a received power is measured on the channel during each quiet time. Whether the received power exceeds a predetermined threshold or not is also determined. When the received power exceeds the predetermined threshold, the presence of radar in that channel is declared.

According to another aspect of the invention, a method of radar detection in a channel for RLANs operating in a regulatory band is disclosed. The first step of the inventive method is to set a quiet time and a quiet period where the quiet time is 1 TU and the quiet period is 4 TUs. Note that TU represents a time unit equal to $2^{10}$ µs defined in the IEEE 802.11 standard. Then the channel is quieted for the quiet time periodically at a rate dictated by the quiet period. During each quiet time, the channel is tested for radar and a received power is measured to determine whether the received power on the channel exceeds a predetermined threshold. Radar presence in that channel is declared when the received power exceeds the predetermined threshold.

DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

To operate in the regulatory band, RLAN equipment must comply with all the following requirements for radar detection.

Requirement 1:

If a radar signal with a power exceeds −52 dBm, the presence of radar shall be detected.

Requirement 2:

Radar detection in a channel shall not exceed 0.2 sec from when a radar signal starts.

Requirement 3:

Before operating in a new channel, a station shall test for the presence of radar for at least a contiguous time equal to 10,000 TUs if the new channel has not been tested for radar for at least 10,000 TUs, or if the channel was previously determined to contain radar during the last 24×60×60×1,000 TUs. Note that TU represents a time unit equal to $2^{10}$ µs defined in the IEEE 802.11 standard.

Requirement 4:

While operating in a channel, a station shall test for the presence of radar for at least an accumulated time equal to 20 TUs of each 100 TUs.

Figure 1:
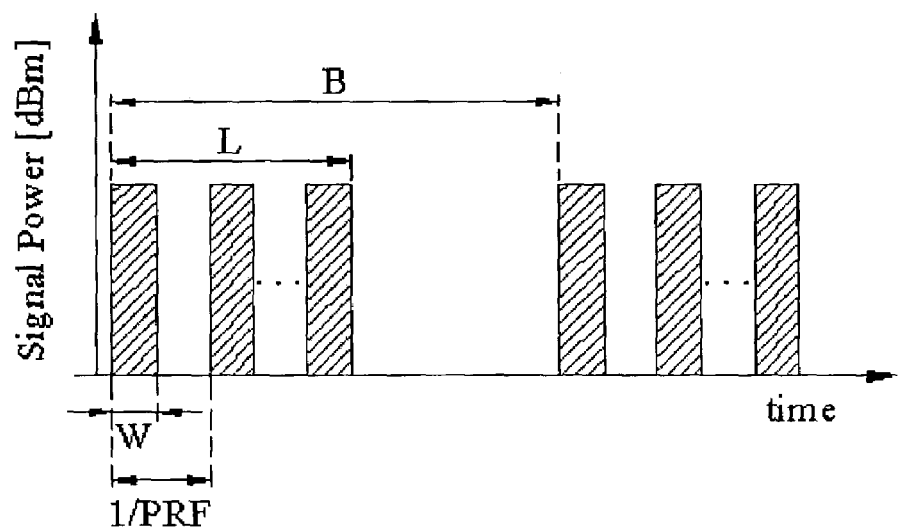
FIG. 1 is a graph illustrating an exemplary radar signal.

The radar detection method of the invention is required to have the capability of testing different radar types. Parameters of such radar signals are listed in table 1 below, in which PRI (Pulse Repetition Interval) is a pulse period equal to 1/PRF. For illustration, FIG. 1 shows general structure of the radar signals in table 1.

TABLE 1

| Radar signal | Operating frequency range [GHz] | Bandwidth [MHz] | Pulse repetition frequency PRF [pps] | Pulse width W [µs] | Burst length L [ms]/No. of pulses | Burst Period B [sec] |
| --- | --- | --- | --- | --- | --- | --- |
| Radar signal 1 | >5.25 | 14 | 700 (PRI = 1.44 ms) | 1 | 26/18 | 10 |
| Radar signal 2 (Maritime) | 5.45–5.82 | 2 | 2000 (PRI = 0.50 ms) | 0.2 | 5/10 | 2 |
| Radar signal 3 (Meteorological) | 5.60–5.80 | 0.6 | 330 (PRI = 3.03 ms) | 2 | 500/165 | 144 |

When designing a mechanism to detect the radar signals of table 1 for the satisfaction of the four requirements described above, four principles are considered as follows:

Principle 1: RSSI detection for determining the presence of radar

Due to the pulse type of radar signals and very short pulse width thereof, it is difficult to deal with radar signals at baseband. The economical and effective way is to detect radar signals simply depending on the RSSI level where RSSI is abbreviated from received signal strength indication and is a measure of received power. According to the Requirement 1, therefore, the presence of radar shall be detected if a radar signal with a power exceeds a predetermined threshold of Γ equal to −(52+σ) dBm where σ is a predetermined value for RSSI measurement margin.

Principle 2: Quieting a channel during radar detection

The maximum received power from transmitter emissions is defined as −30 dBm by the IEEE 802.11h standard. Owing to the use of RSSI detection by the principle 1, the probability of false alarm will be increased if any IEEE 802.11h conformant signal is present. Thus, quieting a channel is required to avoid interference from other devices during radar detection.

Principle 3: Interception of radar signals within a burst length once the first radar burst begins transmitting According to the Requirement 2, radar detection shall not exceed 0.2 sec from when a radar signal starts. However, the maximum burst length and the minimum burst period among the three signals of table 1 are 500 ms and 2 sec, respectively. If interception of the first radar burst fails, the detection time will definitely exceed 0.2 sec. Therefore, the method of radar detection has to ensure that it is capable of detecting the presence of radar within the first burst.

Principle 4: Declaring the presence of radar in a channel if received power exceeds a predetermined threshold Because channels are quieted during testing, the received power during detection is really from radar systems or other interfering sources. When the received power during channel detection exceeds the predetermined threshold, the presence of radar shall be declared.

Principle 2 provides the need of quieting a channel so it can be tested for the presence of radar with less interference from other devices. While quieting a channel, no RLAN devices are allowed to send signals on the channel. This indeed degrades the network throughput. Therefore, the length of the quiet time must be kept as small as possible. Moreover, channel quieting has to be performed periodically since no timing information of radar is available beforehand. To mitigate the throughput degradation, it is important to find a set of optimum parameters to ensure the satisfaction of the aforementioned requirements. The optimum parameter set includes the quiet time and the quiet period, and they can be analyzed as the intercept time problems concerning the coincidences of two periodic pulse trains.

Figure 2:
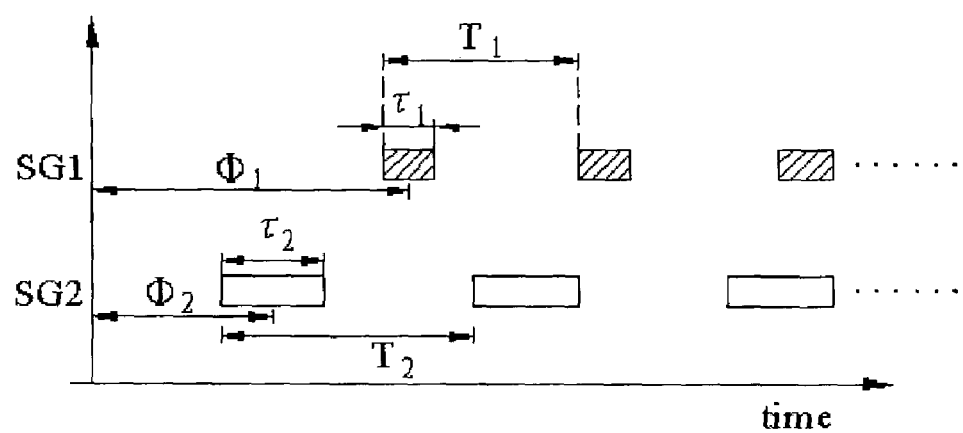
FIG. 2 is a graph illustrating the interception of two periodic pulse trains.

Referring to FIG. 2 now, pulses from the first signal (SG1) occur at times $mT_1+\Phi_1$ and pulses from the second signal (SG2) occur at times $nT_2+\Phi_2$ where m, n are the pulse numbers, $T_1$ and $T_2$ are the pulse periods, and $\Phi_1$ and $\Phi_2$ are the initial time offsets or phases of the signals. The pulses from each signal are assumed to have pulse widths $\tau_1$ and $\tau_2$. In this case, the intercept condition for the mth pulse of the signal SG1 and the nth pulse of the signal SG2 is given by $$nT_2 - \frac{1}{2}\tau_2 + \Phi_2 \leq mT_1 + \frac{1}{2}\tau_1 + \Phi_1 \quad (1)$$

and $$nT_2 + \frac{1}{2}\tau_2 + \Phi_2 \geq mT_1 - \frac{1}{2}\tau_1 + \Phi_1 \quad (2)$$

The inequalities of (1) and (2) can be reduced to $$|mT_1 + \Phi_1 - (nT_2 + \Phi_2)| \leq \frac{\tau_1 + \tau_2}{2} \quad (3)$$

In FIG. 2, the signal SG1 is representative of the radar signals listed in table 1 and the signal SG2 is treated as a quiet cycle. Hence, $T_2$ defines a quiet period and $\tau_2$ represents a quiet time dictating an observation window for radar detection. Under the intercept condition of the inequality of (3), n, $\tau_2$ and $T_2$ can be found to meet the Requirements 2 and 4, as well as the Principle 3. Because of periodicity of signals SG1 and SG2, $\Phi_1$ assumed to be uniformly random over the interval $[0,T_2]$. Also, $\Phi_2$ is set to zero without loss of generality.

Figure 3:
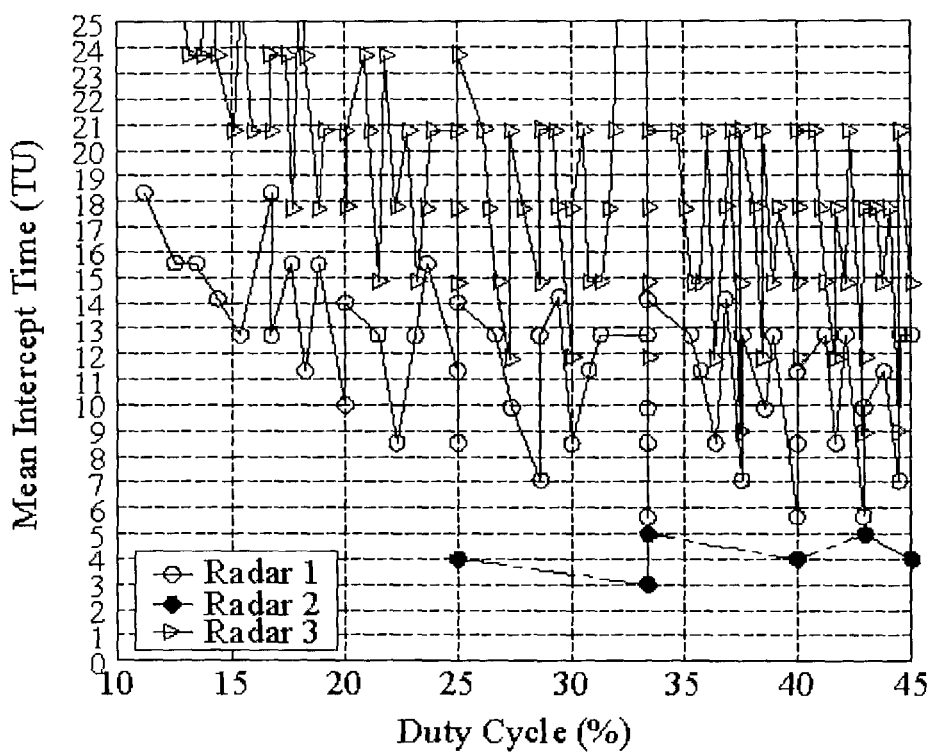
FIG. 3 is a graph showing the mean time to intercept vs. the sample duty cycle of radar detection.
Figure 4:
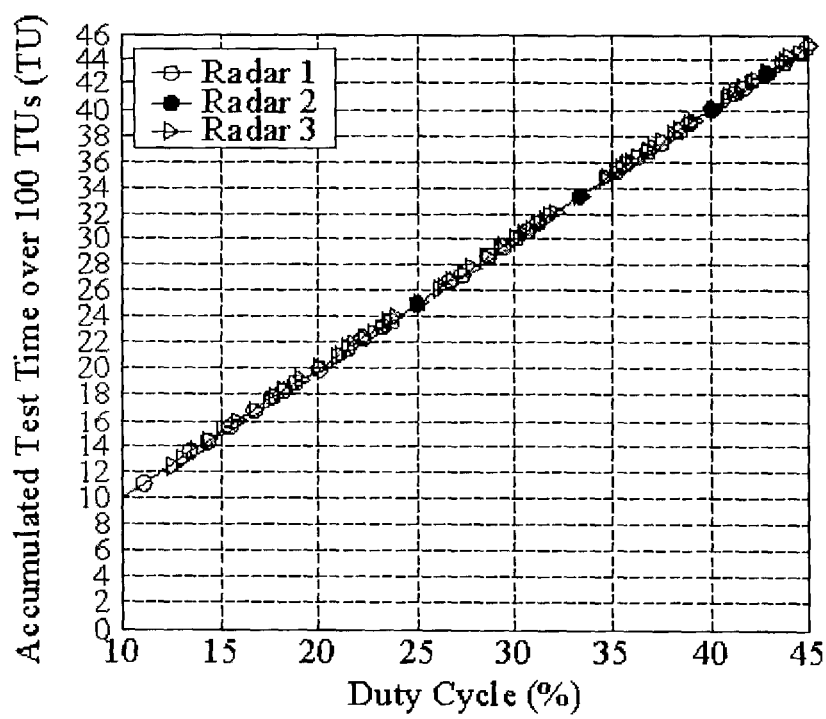
FIG. 4 is a graph showing the accumulated test time within 100 TUs vs. the sample duty cycle of radar detection.
Figure 5:
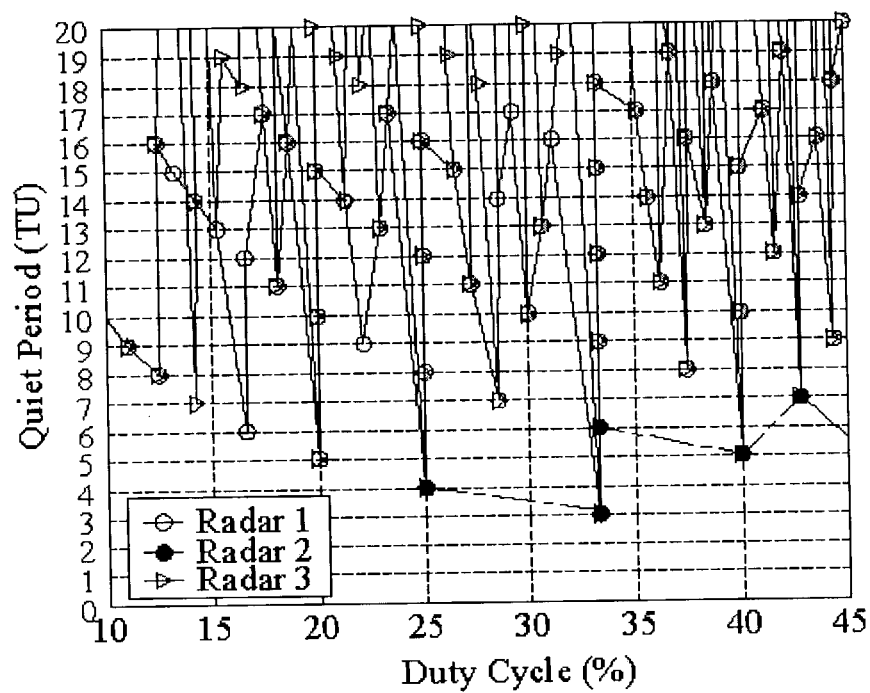
FIG. 5 is a graph showing the quiet period vs. the sample duty cycle of radar detection.
Figure 6:
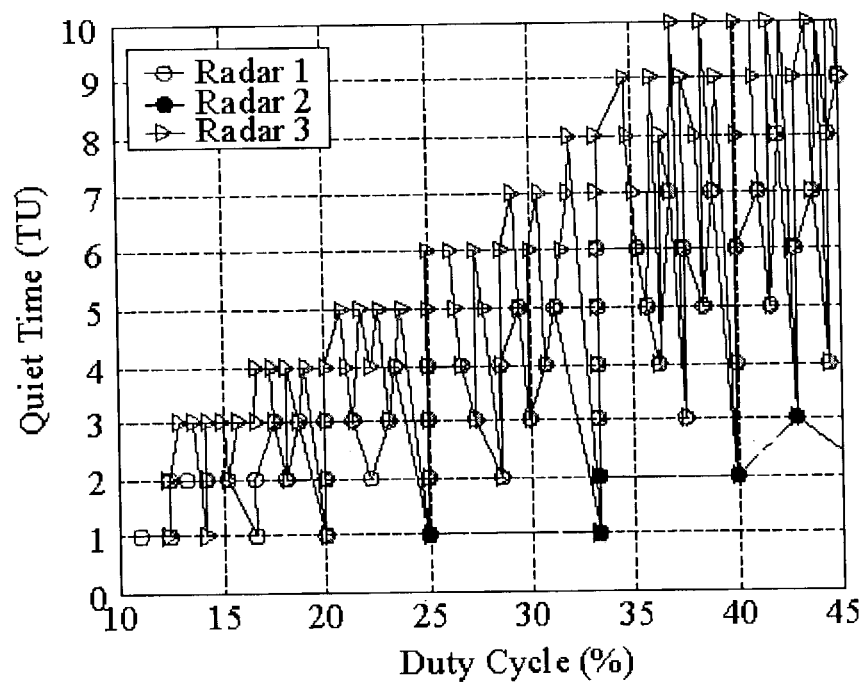
FIG. 6 is a graph showing the quiet time vs. the sample duty cycle of radar detection.

The ways to find n, $\tau_2$ and $T_2$ are beyond the scope of the invention and are not described in detail herein. For example, a straightforward means is to perform an exhaustive search by computers. Tables 2, 3 listed below and FIGS. 3 through 6 illustrate the analysis results. In FIG. 3, $\tau_2/T_2$ is defined as the duty cycle of radar detection. It is shown that the minimum duty cycle to intercept all of the three radar signals is 25%. As shown in FIG. 4, the duty cycle of 25% is equivalent to the accumulated test time of 25 TUs over 100 TUs. This satisfies Requirement 4. From FIGS. 5 and 6, there can be seen that the corresponding quiet period ($T_2$) and quiet time ($\tau_2$) at the duty cycle of 25% are 4 TUs and 1 TU, respectively. From table 2, the mean intercept times corresponding to the radar signals 1, 2 and 3 are 11.28 TUs, 3.91 TUs and 20.71 TUs (when $\tau_2$=1 TU and $T_2$=4 TUs), respectively. Notably, for RLANs operating in the frequency band of 5.15~5.35 GHz, they have to only take the radar signal 1 into account. Thus, the optimum duty cycle can be reduced to 20%. Table 3 shows the analysis results directed to the radar signal 1.

TABLE 2

| Duty Cycle (%) | Quiet time $\tau_2$ (TU) | Quiet period $T_2$ (TU) | Mean Intercept Time (TU) | | |
| --- | --- | --- | --- | --- | --- |
| | | | Radar 1 | Radar 2 | Radar 3 |
| 25 | 1 | 4 | 11.28 | 3.91 | 20.71 |
| 33.33 | 1 | 3 | 12.69 | 2.93 | 147.95 |
| 33.33 | 2 | 6 | 5.64 | 4.88 | 79.89 |
| 40 | 2 | 5 | 5.64 | 3.91 | 14.79 |
| 42.86 | 3 | 7 | 5.64 | 4.88 | 8.88 |
| 50 | 1 | 2 | 4.23 | 1.95 | 8.88 |
| 50 | 2 | 4 | 4.23 | 2.93 | 8.87 |
| 50 | 3 | 6 | 5.64 | 3.91 | 8.87 |
| 50 | 4 | 8 | 5.64 | 4.88 | 8.87 |

TABLE 3

| Duty cycle (%) | Quiet time $\tau_2$ (TU) | Quiet period $T_2$ (TU) | Mean Intercept Time (TU) |
| --- | --- | --- | --- |
| 20.00 | 1 | 5 | 9.87 |
| 20.00 | 2 | 10 | 9.87 |
| 20.00 | 3 | 15 | 14.10 |
| 21.43 | 3 | 14 | 12.69 |
| 22.22 | 2 | 9 | 8.46 |
| 23.08 | 3 | 13 | 12.69 |
| 23.53 | 4 | 17 | 15.51 |
| 25.00 | 1 | 4 | 11.28 |
| 25.00 | 2 | 8 | 8.46 |
| 25.00 | 3 | 12 | 11.28 |
| 25.00 | 4 | 16 | 14.10 |
| 26.67 | 4 | 15 | 12.69 |
| 27.27 | 3 | 11 | 9.87 |
| 28.57 | 2 | 7 | 7.05 |
| 28.57 | 4 | 14 | 12.69 |
| 29.41 | 5 | 17 | 14.10 |
| 30.00 | 3 | 10 | 8.46 |
| 30.77 | 4 | 13 | 11.28 |
| 31.25 | 5 | 16 | 12.69 |
| 33.33 | 1 | 3 | 12.69 |
| 33.33 | 2 | 6 | 5.64 |
| 33.33 | 3 | 9 | 8.46 |
| 33.33 | 4 | 12 | 9.87 |
| 33.33 | 5 | 15 | 12.69 |
| 33.33 | 6 | 18 | 14.10 |
| 35.29 | 6 | 17 | 12.69 |
| 35.71 | 5 | 14 | 11.28 |
| 36.36 | 4 | 11 | 8.46 |
| 36.84 | 7 | 19 | 14.10 |
| 37.50 | 3 | 8 | 7.05 |
| 37.50 | 6 | 16 | 12.69 |
| 38.46 | 5 | 13 | 9.87 |
| 38.89 | 7 | 18 | 12.69 |
| 40.00 | 2 | 5 | 5.64 |
| 40.00 | 4 | 10 | 8.46 |
| 40.00 | 6 | 15 | 11.28 |
| 41.18 | 7 | 17 | 12.69 |
| 41.67 | 5 | 12 | 8.46 |
| 42.11 | 8 | 19 | 12.69 |
| 42.86 | 3 | 7 | 5.64 |
| 42.86 | 6 | 14 | 9.87 |
| 43.75 | 7 | 16 | 11.28 |
| 44.44 | 4 | 9 | 7.05 |
| 44.44 | 8 | 18 | 12.69 |
| 45.00 | 9 | 20 | 12.69 |
| 45.45 | 5 | 11 | 8.46 |

TABLE 3-continued

| Duty cycle (%) | Quiet time $\tau_2$ (TU) | Quiet period $T_2$ (TU) | Mean Intercept Time (TU) |
| --- | --- | --- | --- |
| 46.15 | 6 | 13 | 8.46 |
| 46.67 | 7 | 15 | 9.87 |
| 47.06 | 8 | 17 | 11.28 |
| 47.37 | 9 | 19 | 12.69 |
| 47.62 | 10 | 21 | 12.69 |
| 50.00 | 1 | 2 | 4.23 |
| 50.00 | 2 | 4 | 4.23 |
| 50.00 | 3 | 6 | 5.64 |
| 50.00 | 4 | 8 | 5.64 |
| 50.00 | 5 | 10 | 7.05 |
| 50.00 | 6 | 12 | 8.46 |
| 50.00 | 7 | 14 | 8.46 |
| 50.00 | 8 | 16 | 9.87 |
| 50.00 | 9 | 18 | 11.28 |
| 50.00 | 10 | 20 | 12.69 |

Figure 7:
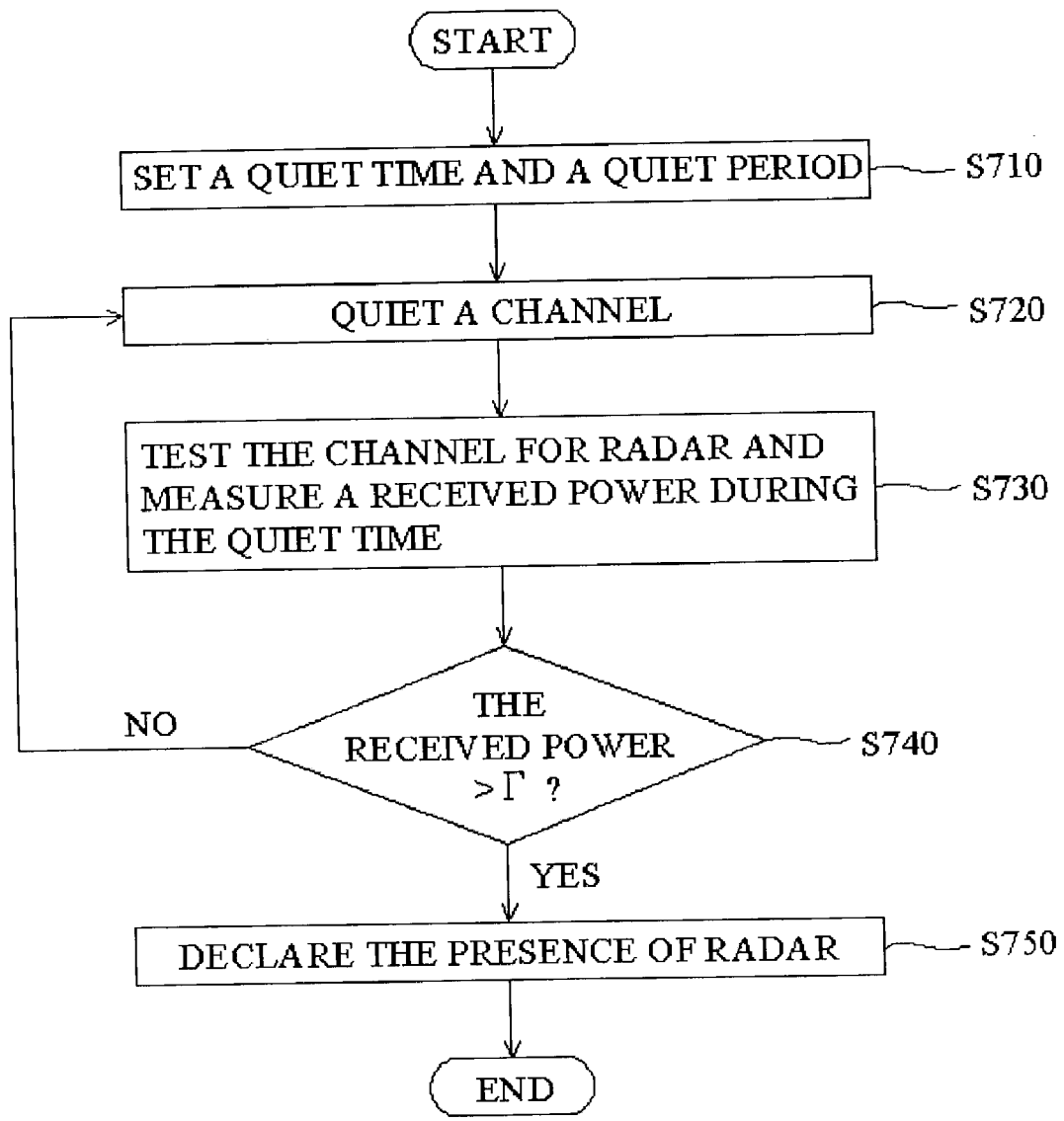
FIG. 7 is a flowchart illustrating a main procedure for determining the presence of radar in a channel according to the invention.

In light of the foregoing discussions, an inventive method of radar detection will now be disclosed in conjunction with FIG. 7. In step S710, the ratio of the quiet time to the quiet period, i.e. the duty cycle of radar detection, is first designated to 25% for full coverage of all regulatory bands. Note that the quiet time of $\tau_2$ is set to 1 TU and the quiet period of $T_2$ is set to 4 TUs, respectively. Alternatively, the duty cycle can be reduced to 20% in the case of equipments used only in the frequency band of 5.15~5.35 GHz, so $\tau_2$ is 1, 2 or 3 TUs and $T_2$ corresponds to 5, 10 or 15 TUs as shown in table 3. Then a channel is quieted for the quiet time periodically at a rate as set in the quiet period (step S720). While quieting the channel, a received power is measured to determine whether the received power exceeds a predetermined threshold (steps S730 and S740). If the predetermined threshold is exactly set to −52 dBm in accordance with the Requirement 1, it is likely to miss detection of radar signals because of RSSI measurement margin and error. Hence, the predetermined threshold is preferably set to less than −52 dBm. According to Principle 1, the method of the invention employs RSSI as a measure of the received power on the channel and the predetermined threshold (Γ) is equal to −(52+σ) dBm. Once the received power during one quiet time exceeds the predetermined threshold, radar presence in that channel is declared (step S750). Otherwise, the process returns to the step S720 for the next channel's quieting and detection.

Accordingly, the invention provides an efficient method of radar detection for RLANs operating in regulatory frequency bands. The inventive method not only satisfies regulatory requirements and standards, but is also simple to implement in an integrated circuit. In addition, the present invention proposes the optimum quiet time and period for radar detection in a channel to mitigate degradation of network throughput.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of radar detection in a channel for radio local area networks operating in a regulatory band, comprising the steps of:

setting a quiet time and a quiet period;
periodically quieting the channel for the quiet time at a rate dictated by the quiet period;
testing the channel for radar and measuring a received power during each quiet time;
determining whether the received power exceeds a predetermined threshold; and
declaring that there is radar operating on the channel when the received power exceeds the predetermined threshold; wherein:
a ratio of at least 25% between the quiet time and the quiet period is designated first;
the quiet time is 1 TU and the quiet period is 4 TUs where TU represents a time unit equal to $2^{10}$ μs; and
wherein the predetermined threshold is —(52+σ) dBm where σ is a predetermined value for measurement margin.

2. The method according to claim 1, wherein the predetermined threshold is less than or equal to —52 dBm.

3. The method according to claim 1, wherein the step of testing and measuring employs Received Signal Strength Indication (RSSI) as a measure of the received power on the channel.

4. The method according to claim 3, wherein the determining step checks to see if the RSSI for the received power during each quiet time exceeds the predetermined threshold.

5. A method of determining the presence of radar in a channel, comprising the steps of:
setting a quiet time and a quiet period;
repeatedly quieting the channel for the quiet time at intervals of the quiet period;
measuring a received power on the channel during each quiet time;
determining whether the received power exceeds a predetermined threshold; and
declaring that there is radar operating on the channel when the received power exceeds the predetermined threshold; wherein the predetermined threshold is —(52+σ) dBm where σ is a predetermined value for measurement margin.

6. The method according to claim 5, wherein the setting step specifies a ratio of at least 25% between the quiet time and the quiet period.

7. The method according to claim 6, wherein the quiet time is 1 TU and the quiet period is 4 TUs where TU represents a time unit defined by the IEEE 802.11 standard.

8. The method according to claim 6, wherein the quiet time is 1 TU and the quiet period is 3 TUs where TU represents a time unit defined by the IEEE 802.11 standard.

9. The method according to claim 6, wherein the quiet time is 2 TU and the quiet period is 6 TUs where TU represents a time unit defined by the IEEE 802.11 standard.

10. The method according to claim 6, wherein the quiet time is 2 TU and the quiet period is 5 TUs where TU represents a time unit defined by the IEEE 802.11 standard.

11. The method according to claim 5, wherein the setting step specifies a ratio of at least 20% between the quiet time and the quiet period.

12. The method according to claim 11, wherein the quiet time is 1 TU and the quiet period is 5 TUs where TU represents a time unit defined by the IEEE 802.11 standard.

13. The method according to claim 11, wherein the quiet time is 2 TU and the quiet period is 10 TUs where TU represents a time unit defined by the IEEE 802.11 standard.

14. The method according to claim 11, wherein the quiet time is 3 TU and the quiet period is 15 TUs where TU represents a time unit defined by the IEEE 802.11 standard.

15. The method according to claim 5, wherein the measuring step employs Received Signal Strength Indication (RSSI) as a measure of the received power on the channel.

16. The method according to claim 15, wherein the determining step checks to see if the RSSI for the received power during each quiet time exceeds the predetermined threshold.

* * * * *